(12) United States Patent
Di Mattia

(10) Patent No.: US 12,081,447 B2
(45) Date of Patent: Sep. 3, 2024

(54) AUTOMATIC CONFIGURATION OF SD-WAN LINK RULES ON A PER APPLICATION BASIS USING REAL-TIME NETWORK CONDITIONS

(71) Applicant: Fortinet, Inc., Sunnyvale, CA (US)

(72) Inventor: Aldo Di Mattia, Rome (IT)

(73) Assignee: Fortinet, Inc., Sunnyvale, CA (US)

( * ) Notice: Subject to any disclaimer, the term of this patent is extended or adjusted under 35 U.S.C. 154(b) by 104 days.

(21) Appl. No.: 17/490,747

(22) Filed: Sep. 30, 2021

(65) Prior Publication Data

US 2023/0097061 A1    Mar. 30, 2023

(51) Int. Cl.
*H04L 47/283* (2022.01)
*H04L 12/46* (2006.01)
*H04L 45/64* (2022.01)
*H04L 47/20* (2022.01)

(52) U.S. Cl.
CPC ............ *H04L 47/283* (2013.01); *H04L 12/46* (2013.01); *H04L 45/64* (2013.01); *H04L 47/20* (2013.01)

(58) Field of Classification Search
CPC ....... H04L 47/283; H04L 12/46; H04L 45/64; H04L 47/20; H04L 41/08
See application file for complete search history.

(56) References Cited

U.S. PATENT DOCUMENTS

2020/0382387 A1\* 12/2020 Pasupathy ............. H04L 45/123
2023/0080537 A1\* 3/2023 Ramanathan ......... H04L 45/306
709/238

\* cited by examiner

*Primary Examiner* — Jung H Park
(74) *Attorney, Agent, or Firm* — Law Office of Dorian Cartwright; Dorian Cartwright

(57) ABSTRACT

New link requests are received and an application making the request is identified. SD-WAN parameters are retrieved from an application control database. A first parameter is a JLP loss requirement for the application, and can be either low JLP, medium JLP, or high JLP SLA level. A second parameter a downstream/upstream bandwidth capability requirement. Links are determined from the pool of available links that meet the JLP requirement. One of the links is selected for the new link request, from the pool of available links that meet the JLP requirement, based on a downstream and an upstream bandwidth capability. The best link is automatically activated for the new link request.

10 Claims, 8 Drawing Sheets

| Name | Category | Technology | Popularity | Rhik | SDWAN link |
|---|---|---|---|---|---|
| ☐ Application Signature ⊙ | | | | | ☐ Application Signature ⊙ |
| Gmail | Email | Browser-Based | ★★★★★ | ▨▨▨▨ | Normal AP, Downstream, upstream |
| Dropbox_FileDownload | Storage Backup | Browser-Based | ★★★★★ | ▨▨▨▨ | Normal AP, Downstream |
| Dropbox_FileDownload | Storage Backup | Browser-Based | ★★★★★ | ▨▨▨▨ | Normal AP, Upstream |
| MicrosoftOutlookOffice365 | Email | Browser-Based | ★★★★★ | ▨▨▨▨ | Normal AP, Downstream, upstream |
| MicrosoftTeams | Collaboration | Client-Server | ★★★★★ | ▨▨▨▨ | Low AP, downstream, upstream |
| MicrosoftTeams_FileDownload | Collaboration | Browser-Based Client-Server | ★★★★★ | ▨▨▨▨ | Normal AP, Downstream |
| MicrosoftTeams_FileUpload | Collaboration | Browser-Based Client-Server | ★★★★★ | ▨▨▨▨ | Normal AP, Upstream |
| WhatsApp_VoipCall | Collaboration | Client-Server | ★★★★★ | ▨▨▨▨ | Low JLP, dowstream, upstream |

FIG. 4A

| FortiWiFi 61E | Homade | | | | | | >-☐ ⑦ ▼ ۞ ⑧ admin ▼ |
|---|---|---|---|---|---|---|---|
| | + Create New | Create New rules | | | | | |
| | | Create New Automatic Rule | | | | | |
| | ID | | Source | Destination | Criteria | Members | Hit Count |
| ⊞ IPv4 ② | | | | | | | |
| | 1 | custom1 | | Acronis Snap.Deploy Act! | SLA | Internal6 Internal7 | 0 |
| | 2 | custom2 | | Acronis-Cyber.Cloud Act-on-DNS Act-on-FTP | SLA | | |
| ⊞ Automatic | | | | | | | |
| | | Automatic rule | all all | all all | Source IP | any | |
| ⊞ Implicit ① | | | | | | | |
| | | sd-wan | all all | all all | Source IP | any | |

| Dashboard | > | Priority Rule |
|---|---|---|
| Dashboard | > | Name [          ] |
| Network | > | IP Version [IPv4][IPv5] |
| Interfaces | | |
| DNS | | Source |
| DNS Servers | | Source address [    ] + |
| Explicit Proxy | | User group [    ] + |
| Packet Capture | | |
| SD-WAN Zones | | Destination |
| SD-WAN Rules ☆ | | Address [    ] + |
| Performance SLA | | Internet Service [    ] + |
| Static Routes | | Application [    ] + |
| Policy Routes | | |
| RIP | | Outgoing Interfaces |
| OSPF | | ○ Lowest Cost (SLA) |
| BGP | | The interface that meets SLA targets is selected when there is a big, the interface with the lowest assigned cost is selected. |
| Multicast | | ○ Maximize Bandwidth (SLA) |
| Fort Extender | | Traffic is load balanced among interfaces that meet SLA targets. |
| ✦ System ● | > | Interface preformance [    +    ] |
| 🔒 Policy & Objects | > | Forward DSCP ⬤ ⬤ |
| 🛡 Security & Profiles | > | Reverse DSCP ⬤ ⬤ |
| | | Status ⊕Enable ⊕Disable |

| Low Latency/Jitter/PL SLA | Medium Latency/Jitter/PL SLA | High Latency/Jitter/PL SLA |
|---|---|---|
| ▯ Automatic ❶ | | |
| SLA [         ▼] | SLA [         ▼] | SLA [         ▼] |
| ↗ | ↗ | ↗ |
| Example: | Example: | Example: |
| Jitter 5ms | Jitter 20ms | Jitter 30ms |
| Latency 5ms | Latency 20ms | Latency 30ms |
| Packet loss 0% | Packet loss 1% | Packet loss 3% |

[ OK ]  [ Cancel ]

FIG. 4C

AUTOMATIC CONFIGURATION OF SD-WAN LINK RULES ON A PER APPLICATION BASIS USING REAL-TIME NETWORK CONDITIONS

FIELD OF THE INVENTION

The invention relates generally to computer networking, and more specifically, for automatically configuring SD-WAN (software defined-wide area networking) rules on a per application basis.

BACKGROUND

Generally, an SD-WAN is a virtual WAN architecture for connecting enterprises and data centers over large geographical distances. Cloud-based applications and other are separated from underlying network services with a policy-based, virtual overlay, making the cloud-based applications easily deployable.

Problematically, today's SD-WAN rules are manually configured by a user. The network environment is assumed although network conditions are constantly changing. Furthermore, each application can have its own unique requirements for SD-WAN links. When new cloud applications are deployed then additional rule configurations are needed.

Therefore, what is needed is a robust technique for automatically configuring SD-WAN rules on a per application basis using real-time network conditions.

SUMMARY

These shortcomings are addressed by the present disclosure of methods, computer program products, and systems for automatically configuring SD-WAN rules on a per application basis.

In one embodiment, real-time network conditions are monitored for a pool of available links on an SD-WAN for a pool of applications. The network conditions include at least JLP (jitter, latency and packet) loss values and categorized as either low JLP, medium JLP, or high JLP. Also, parameters for JLP are associated with applications stored in an application database.

In another embodiment, new link request is received and an application making the request is identified. SD-WAN parameters are retrieved from an application control database. A first parameter is a JLP loss requirement for the application, and can be either low JLP, medium JLP, or high JLP SLA level. A second parameter a downstream/upstream bandwidth capability requirement. Links are determined from the pool of available links that meet the JLP requirement. One of the links is selected for the new link request, from the pool of available links that meet the JLP requirement, based on a downstream and an upstream bandwidth capability. The best link is automatically activated for the new link request Advantageously, SD-WAN configuration is simplified for ordinary users.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 4A-4C are a high-level flow diagrams illustrating examples of user interfaces for entering SD-WAN parameters and JLP rules, according to one preferred embodiment.

DETAILED DESCRIPTION

The description below provides methods, computer program products, and systems for automatically configuring SD-WAN rules on a per application basis. One of ordinary skill in the art will recognize many additional variations made possible by the succinct description of techniques below.

Figure 2:
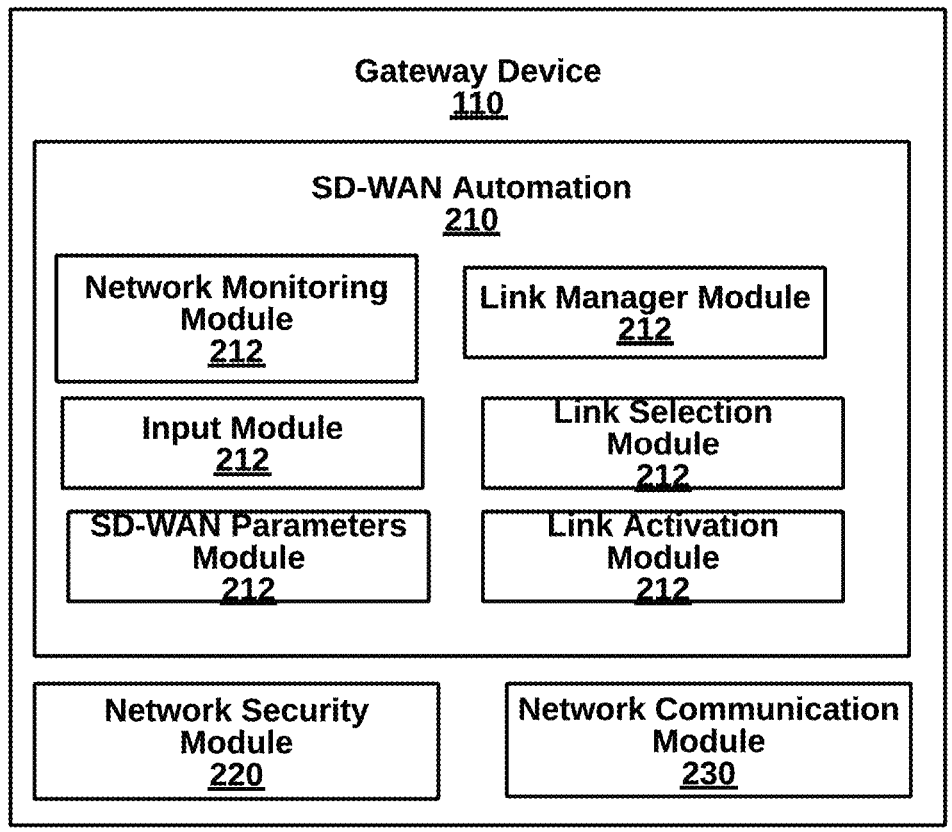
FIG. 2 is a more detailed illustration of a network device of the system of FIG. 1, according to an embodiment.
Figure 3:
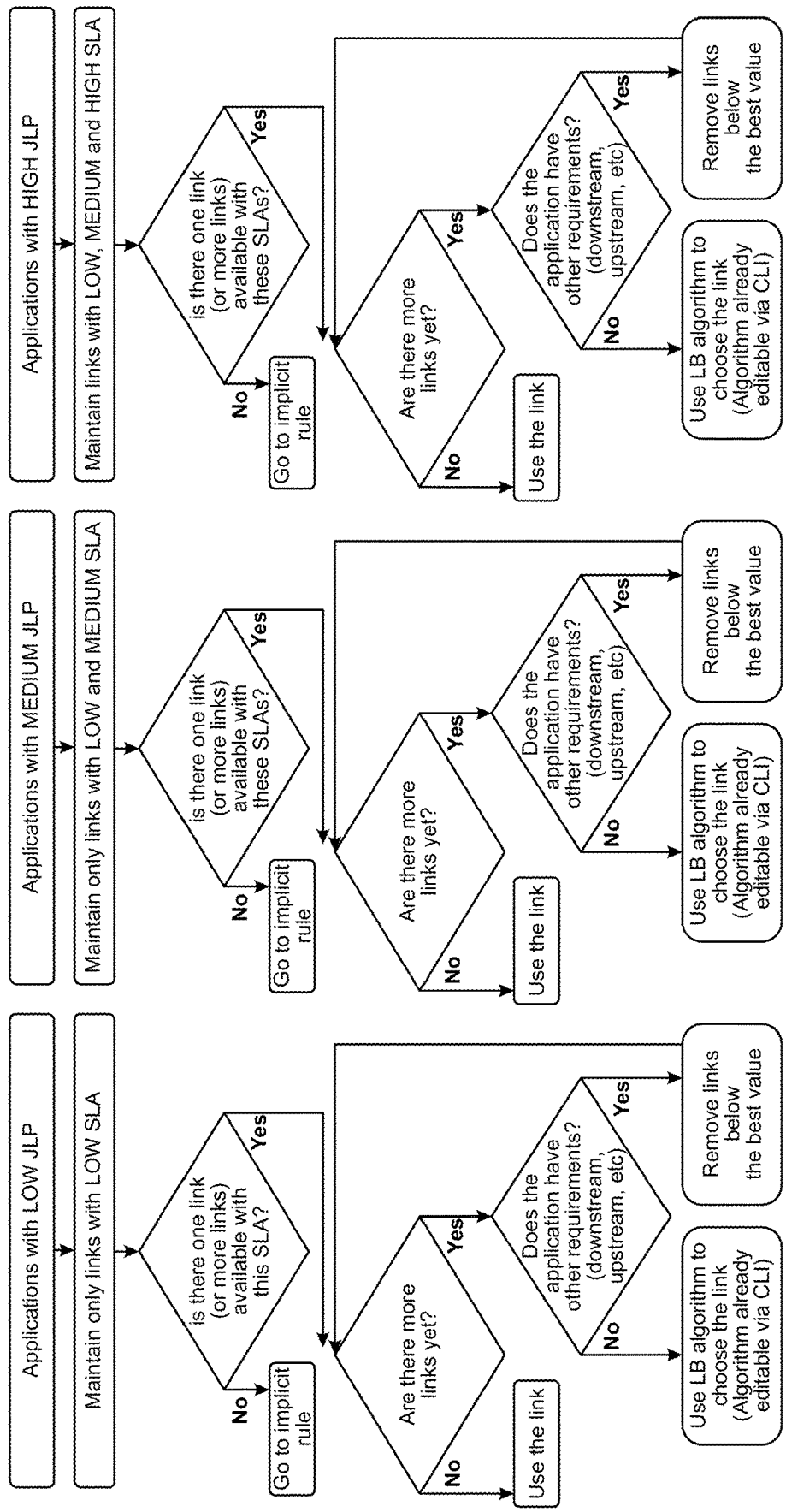
FIG. 3 is a more detailed illustration of an automatic link aggregation module of FIG. 2, according to some embodiments.

I. Systems for Automatic Configuration of SD WAN Rules (FIGS. 1-3)

Figure 1:
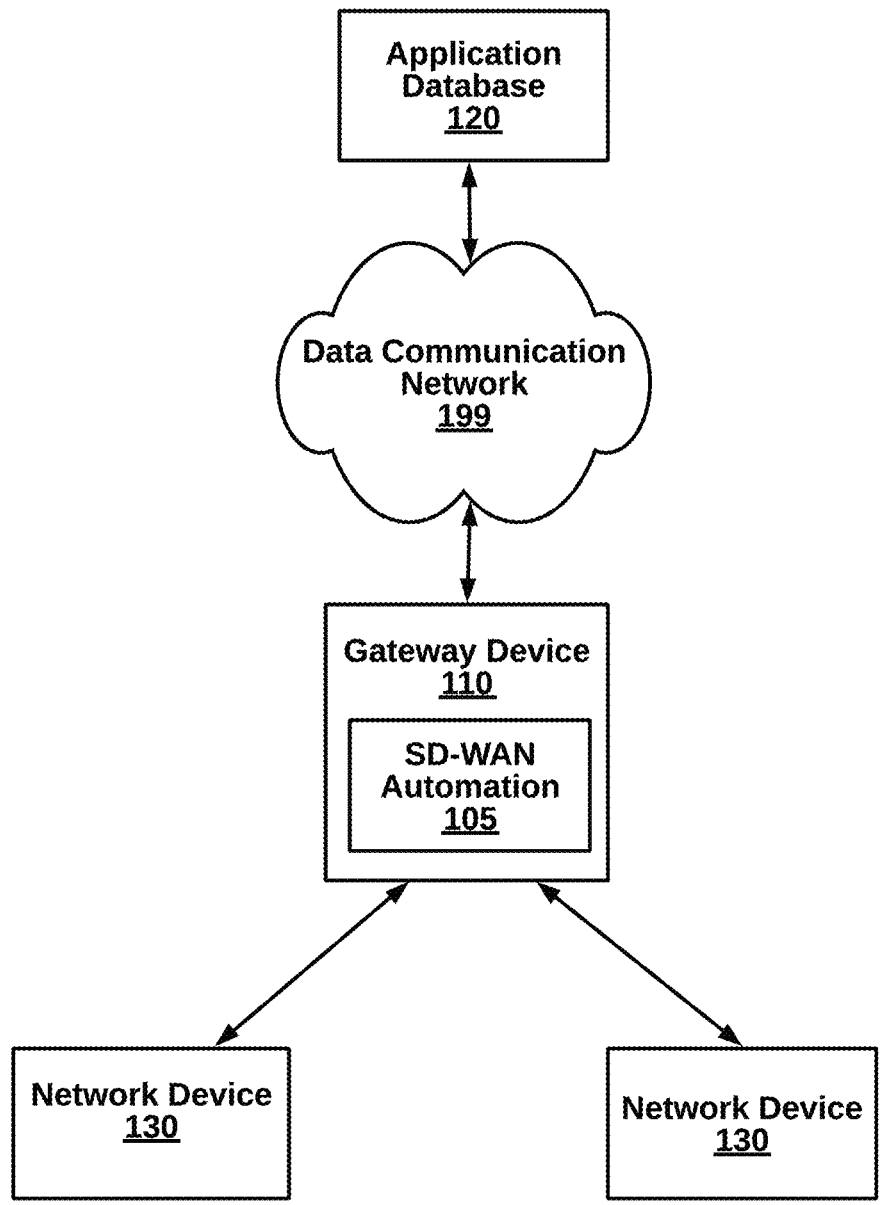
FIG. 1 is a high-level illustration of a system for automatically configuring SD-WAN rules on a per application basis, according to an embodiment.

FIG. 1 is a high-level illustration of a system 100 for automatically configuring SD-WAN rules on a per application basis, according to an embodiment. The system 100 includes a gateway device 110 connected remotely over a data communication network 199 to an application database 120. The gateway device 110, in turn, is part of an enterprise network including the network devices 130A and 130B. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the gateway device 110 is connected to a hardware component of the data communication network 199 via hard wire. Other components, such as the network devices 130A and 130V can be connected indirectly via wireless or wired connection. The data communication network 199 can be the Internet, a WAN, a LAN, WLAN, a cellular network (e.g., 3G, 4G, 5G or 6G), or a hybrid of different types of networks. Various data protocols can dictate format for the data packets, such as IEEE 802.3. Physical links can be fibers or copper.

The gateway device 110, in an embodiment, automatically configures SD-WAN rules for ensuring tolerable JLP and SLA for links. The automated link rules can be created in a user interface such as shown in FIG. 4B and applied for SLA (service level agreements) necessary for applications such as Teams, GoToMeetings, Skype, and the like as shown in FIG. 4A. In an SD-WAN automatic rule algorithm of FIG. 3, applications with low (e.g., jitter 5 ms, latency 5 ms, packet loss 0%), medium (e.g., jitter 20 ms, latency 20 ms, packet loss 1%) and high (e.g., jitter 30 ms, latency 30 ms, packet loss 3%) JLP are distinguished, as shown in FIG. 4C. Applications with low JLP can maintain only links with low SLA, while applications with medium JLP can maintain only links with low and medium SLA, and applications with high JLP can maintain links with low, medium and high SLA. A first parameter is checked to see if there are one or more links available with the appropriate SLAs. For multiple available links, a second parameter can be checked for downstream and/or upstream bandwidth requirements. If there is no second parameter, a load balancing algorithm can be used to select a link, in one implementation.

Best link(s) for every application is calculated on available links based on SLA and the order of other parameter, for example, GMail, Teams and Drobpox links may be selected from the following pool of available links:

Link A is into low JLP SLA—upstream 10 Mbps—downstream 5 Mbps;

Link B is into low JLP SLA—upstream 10 Mbps—downstream 10 Mbps;

Link C is into Normal JLP SLA—upstream 100 Mbps—downstream 20 Mbps;

Link D is into Normal JLP SLA—upstream 50 Mbps—downstream 50 Mbps; and

Link E is into High link SLA—upstream 100 Mbps—downstream 50 Mbps.

Gmail (Normal JLP) can use links A-B-C-D and based on second parameter (downstream) it will use link D (the highest).

Teams (Low) can use links A-B and based on second parameter (downstream) it will use link B (the highest).

DropBox-File-Upload (Medium) can use links A-B-C-D and based on second value (upstream) it will use link C (the highest).

Further details of the gateway device 110 are discussed below in association with FIG. 2.

FIG. 2 is a more detailed illustration of the gateway device 110 of the system 100 of FIG. 1. The gateway device 110 includes a network monitor module 210, an input module 220 and a SD-WAN parameters module 230. The modules can be implemented in source code stored in non-transitory memory executed by a processor. Alternatively, the modules can be implemented in hardware with microcode. The modules can be singular or representative of functionality spread over multiple components.

The network monitor module 210, in an embodiment, monitors real-time network conditions for a pool of available links on an SD-WAN for a pool of applications. The network conditions including at least jitter, latency and packet (JLP) loss values and categorized as either low JLP, medium JLP, or high JLP.

The input module 220 receives a new link request and identify an application making the request.

The SD-WAN parameters module 230 in one implementation sets parameters for applications in an application control database. One set of parameters is jitter, latency, packet loss, downstream bandwidth, upstream bandwidth, and cost. Many variations are possible. Each application can have one or more parameters, specialized parameters, and a priority or weighting of parameters. When the application is identified, the SD-WAN parameters module 230 can retrieve SD-WAN parameters from an application control database. A first parameter can be a JLP loss requirement for the application as either low JLP, medium JLP, or high JLP SLA level. A second parameter can be an downstream/upstream bandwidth capability requirement. Parameters can be set in a user interface as shown in FIGS. 4A, 4B, 4C.

The link manager module 240 determines links from the pool of available links that meet the JLP requirement.

The link selection module 250 can select one or more of the links for the new link request, from the pool of available links that meet the JLP requirement, based on a downstream and an upstream capability.

The link activation module 260 automatically activates the best link the new link request. In some embodiments, a second best link is automatically activated responsive to an issue with the best link.

II. Methods for Automatic Configuration of SD WAN Rules (FIG. 5)

Figure 5:
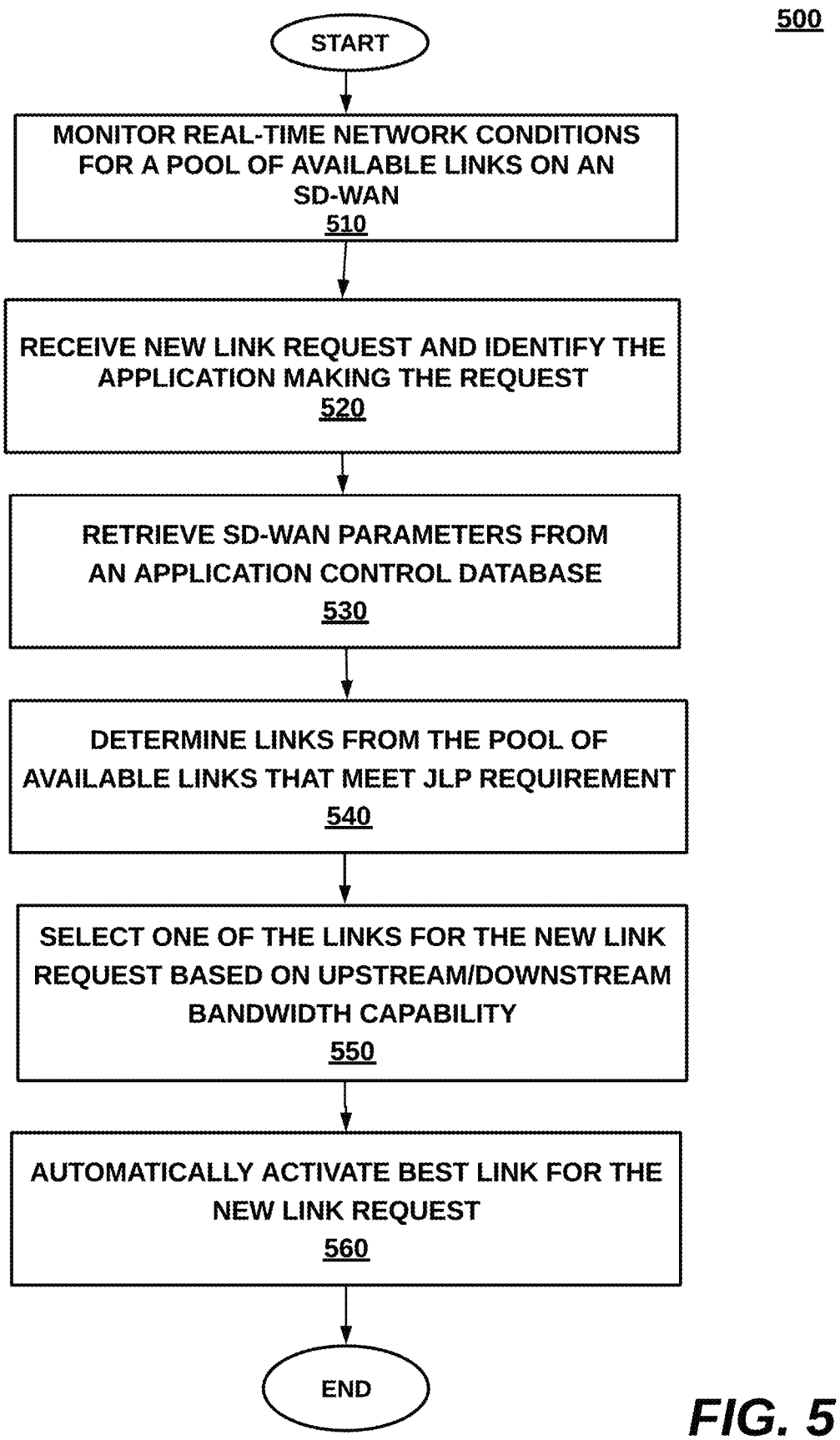
FIG. 5 is a more detailed flow diagram illustrating the step of automatically configuring SD-WAN rules on a per application basis, according to one embodiment.

FIG. 5 is a high-level flow diagram illustrating a method 500 for automatically configuring SD-WAN rules on a per application basis, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 510, real-time network conditions are monitored for a pool of available links on an SD-WAN for a pool of applications. The network conditions include at least jitter, latency and packet (JLP) loss values and categorized as either low JLP, medium JLP, or high JLP.

At step 520, a new link request is received and an application making the request is identified. Application identification can be through a variety of techniques, such as deep packet inspection, and profile matching an unknown application to a database of known applications.

At step 530, SD-WAN parameters are retrieved from an application control database. A first parameter of a JLP loss requirement for the application can be either low JLP, medium JLP, or high JLP SLA level and a second parameter a downstream/upstream capability requirement. Other parameters types and values are possible in other implementations.

At step 540, links are determined from the pool of available links that meet the JLP requirement. In some embodiments, there are available links that do not meet the JLP requirement and thus are not used for links.

At step 550, one of the links is selected for the new link request, from the pool of available links that meet the JLP requirement, based on a downstream and an upstream capability.

At step 560, the best link is automatically activated for the new link request.

III. Generic Computing Device (FIG. 6)

Figure 6:
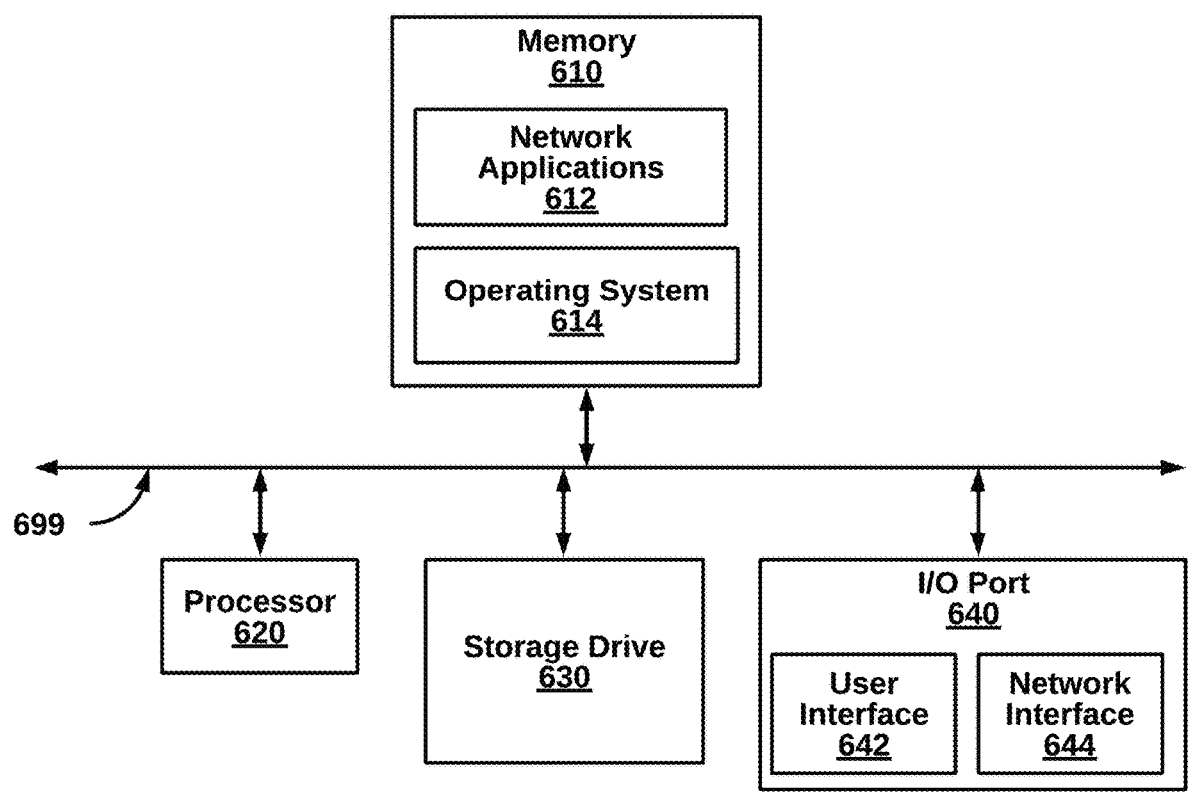
FIG. 6 is an example of a computing environment for implementing components of the system of FIG. 1, according to an embodiment.

FIG. 6 is a block diagram illustrating an example computing device 600 for use in the system 100 of FIG. 1, according to one embodiment. The computing device 600 is implementable for each of the components of the system 100 (e.g., the gateway device 110, the application database 120 and the network devices 130A and 130B). The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A gateway device on a data communication network that connects with a plurality of network devices, for automatically configuring SD-WAN (software defined-wide area networking) rules on a per application basis using real-time network conditions, the gateway device comprising:
   a processor;
   a network interface communicatively coupled to the processor and to the enterprise network and to the Wi-Fi network; and
   a memory, storing:
      a first module to monitor real-time network conditions for a pool of available links on an SD-WAN for a pool of applications, the network conditions including at least JLP (jitter, latency and packet) loss values and categorized as either low JLP, medium JLP, or high JLP;
   a second module to receive a new link request and identify an application making the request by profile matching the application to a database of known applications;
   a third module to retrieve SD-WAN parameters from an application control database for the application identified from the new link request, a first parameter being a JLP loss requirement for the application as either low JLP, medium JLP, or high JLP SLA level and a second parameter a downstream/upstream capability requirement;
   a fourth module to determine links from the pool of available links that meet the JLP requirement;
   a fifth module to select one of the links for the new link request, from the pool of available links that meet the JLP requirement, based on a downstream and an upstream capability; and
   a sixth module to automatically activate the best link the new link request.

2. The gateway device of claim 1, wherein the fourth module determines the best link for the specific application based on an SLA value associated with the specific application.

3. The gateway device of claim 1, wherein the fourth module determines the best link for the specific application based on SLA values for the pool of available links relative to the SLA value associated with the specific application.

4. The gateway device of claim 1, wherein the fourth module selects from low SLA links for applications with a low JLP requirement.

5. The gateway device of claim 1, wherein the fourth module selects from low SLA links and medium SLA links for applications with a medium JLP requirement.

6. The gateway device of claim 1, wherein the fourth module selects from low SLA links, medium SLA links and high SLA links for applications with a high JLP requirement.

7. The gateway device of claim 1, wherein the additional load balancing factors affect the best link determination.

8. The gateway device of claim 1, wherein the application control database on a server located remotely across the data communication network from the gateway device, wherein the application control database services a plurality of gateway devices.

9. A computer-implemented method in a gateway device on a data communication network that connects with a plurality of network devices, for automatically configuring SD-WAN (software defined-wide area networking) rules on a per application basis using real-time network conditions, the method comprising the steps of:
   monitoring real-time network conditions for a pool of available links on an SD-WAN for a pool of applications, the network conditions including at least jitter, latency and packet (JLP) loss values and categorized as either low JLP, medium JLP, or high JLP;
   receiving a new link request and identify an application making the request;
   retrieving SD-WAN parameters from an application control database for the application identified from the new link request, a first parameter being a JLP loss requirement for the application as either low JLP, medium JLP, or high JLP SLA level and a second parameter a downstream/upstream capability requirement;
   determining links from the pool of available links that meet the JLP requirement;
   selecting one of the links for the new link request, from the pool of available links that meet the JLP requirement, based on a downstream and an upstream capability; and
   automatically activating the best link the new link request.

10. A non-transitory computer-readable media in a gateway device on a data communication network that connects with a plurality of network devices that, when executed by a processor, performs a method for automatically configuring SD-WAN (software defined-wide area networking) rules on a per application basis using real-time network conditions, the method comprising the steps of:
   monitoring real-time network conditions for a pool of available links on an SD-WAN for a pool of applications, the network conditions including at least jitter, latency and packet (JLP) loss values and categorized as either low JLP, medium JLP, or high JLP;
   receiving a new link request and identify an application making the request;
   retrieving SD-WAN parameters from an application control database for the application identified from the new link request, a first parameter being a JLP loss requirement for the application as either low JLP, medium JLP, or high JLP SLA level and a second parameter a downstream/upstream capability requirement;
   determining links from the pool of available links that meet the JLP requirement;
   selecting one of the links for the new link request, from the pool of available links that meet the JLP requirement, based on a downstream and an upstream capability; and
   automatically activating the best link the new link.

* * * * *